United States Patent [19]

Matsumoto et al.

[11] 4,297,015
[45] Oct. 27, 1981

[54] CAMERA AUTOMATIC FOCUS APPARATUS

[75] Inventors: Toshiaki Matsumoto, Izumisano; Keisuke Maeda, Sakai, both of Japan

[73] Assignee: Minolta Camera Kabushiki Kaisha, Osaka, Japan

[21] Appl. No.: 127,044

[22] Filed: Mar. 4, 1980

[30] Foreign Application Priority Data

Mar. 5, 1979 [JP] Japan .................................. 54-25840

[51] Int. Cl.³ .......................... G03B 7/083; G03B 3/10
[52] U.S. Cl. ...................................... 354/25; 354/169; 354/195; 354/266
[58] Field of Search .................... 354/25, 31, 163, 168, 354/169, 195, 266, 268, 198; 380/46; 352/140; 355/56

[56] References Cited

U.S. PATENT DOCUMENTS 3,720,148  3/1973  Harvey .............................. 95/44 C
4,229,089  10/1980 Kitai et al. ............................ 354/25

FOREIGN PATENT DOCUMENTS 2656656  6/1978  Fed. Rep. of Germany .
2856653  5/1979  Fed. Rep. of Germany ........ 354/25

OTHER PUBLICATIONS

Photographic Industries, Dec. 1978, pp. 70-74.
Photographic Industries, Feb. 1979, pp. 70-74.

Primary Examiner—L. T. Hix
Assistant Examiner—Stafford D. Schreyer
Attorney, Agent, or Firm—Watson, Cole, Grindle & Watson

[57] ABSTRACT

A camera enables normal photographing where automatic focus adjustment and exposure operation are sequentially effected in response to a shutter release operation, and focus memory photographing where automatic focus adjustment is effected independently of exposure operation at any time prior to a shutter release operation. A movable member for operating range finding means and allowing following movement of an objective setting member and a shutter actuating member is released for movement under a spring action either by operation of a shutter release member or by operation of a focus memory operating member from a neutral position to an operating position, while the shutter actuating member is prevented from following the movable member by first and second arresting members. For normal photographing, the second arresting member is at first disabled in response to a shutter release operation and the first arresting member is disabled by the movable member immediately before the movable member completes travelling after completion of automatic focus adjustment. For focus memory photography, the first arresting member is at first disabled after completion of automatic focus adjustment, and thereafter the second arresting member is disabled in response to a shutter release operation.

5 Claims, 1 Drawing Figure

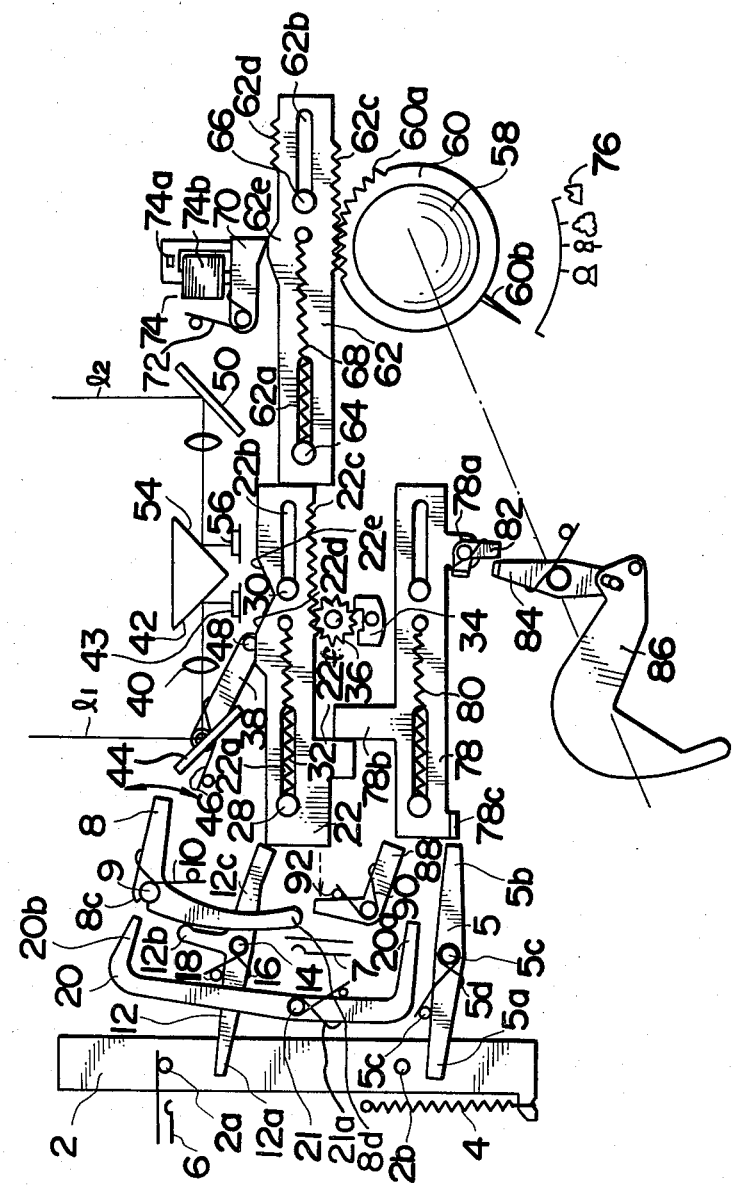

CAMERA AUTOMATIC FOCUS APPARATUS

FIELD OF THE INVENTION

The present invention relates to a camera capable of automatic focus adjustment in response to a shutter release operation prior to exposure operation, and more particularly it relates to a focus memory device whereby manipulation of a focus memory operating member causes automatic focus adjustment independently of exposure operation, to thereby enable focus memory photographing with a focus condition which has been automatically adjusted at any time prior to a shutter release operation.

BACKGROUND OF THE INVENTION

Various cameras capable of automatic focus adjustment are known, whereby a shutter release operation causes travelling of a movable member for range finding as well as enabling an automatic setting of an objective in accordance with the result of the range finding, prior to actual shutter release, i.e., exposure operation. Such cameras are provided with a focus memory device which enables focus memory photographing with a focus condition which has been automatically adjusted at any time prior to a shutter release operation. As generally the range finding is effected with respect to a relatively small center region of a scene being aimed at through a viewfinder, the focus memory device is extremely useful where a photographer intends to take a photograph with a main object arranged at a marginal region of a picture and with the same object being in focus. Particularly, in such a case, the focus memory device is actuated with the main object being aimed at the center of the viewfinder image field, and then the direction of the camera is changed such that the main object can be disposed at a marginal region of the viewfinder image field, after which a shutter release operation is carried out.

One example of prior art focus memory devices of the above described type is disclosed in Japanese magazine "Photographic Industries", December 1978, at pages 70 to 74. With this prior art focus memory device, manipulation of a focus memory operating member causes travelling of a movable member so that range finding is effected while an objective is automatically set to focus on an aimed object in accordance with a range finding operation. The movable member is adapted to release a shutter at a final stroke of its travel, but is arrested by an arresting member prior to reaching the position for the release of the shutter. When a shutter release member is operated thereafter, the movable member is released from the arresting member to thereby travel for the final stroke, so that the shutter is released to effect an exposure. However, this focus memory device is disadvantageous in that it requires a large force for driving the movable member because the movable member, once arrested by the arresting member to stop travelling, must release the shutter after restarting travelling within a relatively short stroke. Thus, the durability of the components, particularly the movable member and the arresting member which is engaged by the movable member travelling under the large driving force, is poor.

SUMMARY OF THE INVENTION

Accordingly, it is an object of the present invention to provide a camera of the described type having an improved focus memory device which makes it possible to drive a movable member for operating a range finding means with a relatively small force, thereby enhancing component durability.

It is another object of the present invention to provide a camera of the type described which is further characterized in that a focus memory operating member is prevented from operation after a shutter release operation for carrying out normal photographing.

It is still another object of the present invention to provide a camera of the type described which is characterized in that the focus memory operating member also serves as a means for resetting the movable member, thereby allowing automatic focus re-adjustment in the event that a photographer intends to change the object of the focus memory photographing from one to another subject.

In a camera according to the present invention, a movable member for operating a range finder means travels from an initial position to a terminal position under action of a spring means both in the case of normal photographing and in the case of focus memory photographing. The movable member is normally locked at the initial position by a locking member, which is moved to release locking either when a release member is manually moved by a given first stroke, or when a focus memory member is operated from a neutral position to an operating position. In response to the movement of the movable member to the terminal position, the range finding means is operated to carry out range finding while an objective setting member is moved by following the movable member. When the objective setting member reaches a position where an objective is set for an optimum focus with respect to an object being aimed at by the range finding means, an electromagnetic means connected to the range finding means arrests the objective setting means, thereby completing automatic focus adjustment. A shutter actuating member is also urged to follow the movable member, and the shutter is actuated for an exposure by the movement of the shutter actuating member following the movement of the movable member. However, for preventing the shutter actuating member from following the movable member, first and second arresting members are arranged in the path of movement of the shutter actuating member. The first arresting member is also arranged in the path of movement of the movable member such that it is engaged thereby for movement toward the outside of the path of movement of the shutter actuating member immediately prior to the movable member reaching the terminal position. The second arresting member is also arranged in the path of movement of the release member such that it is engaged thereby for movement toward the outside of the path of movement of the shutter actuating member when the release member is moved by a given second stroke which is shorter than the first stroke.

For normal photographing, only the release member is operated. When it is moved by the second stroke, the first arresting member goes out of the path of movement of the shutter actuating member so that it can no longer arrest it, while at this time the second arresting member can arrest the shutter actuating member. When the release member is moved by the first stroke, the locking member releases the movable member, whereby the movable member is moved from the initial position to the terminal position under the action of the spring means, causing operation of the range finding means and the following movement of the objective setting member and the shutter actuating member. During the movement of the movable member, automatic focus adjustment is completed as described above, and the second arresting member goes out of the path of movement of the shutter actuating member to release the same immediately prior to the movable member reaching the terminal position. Accordingly, automatic focus adjustment and exposure operation are sequentially effected in response to the movement of the release member, i.e., a shutter release operation.

For focus memory photographing, the focus memory operating member is first operated to the operative position. Then, the locking member releases the movable member, whereby automatic focus adjustment is carried out. The first arresting member goes out of the path of movement of the shutter actuating member due to completion of the travel of the movable member so that it can no longer arrest the shutter actuating member, while at this time the second arresting member can arrest the shutter actuating member. Accordingly, only automatic focus adjustment is possible. When the release member is moved thereafter by the second stroke, the second arresting member goes out of the path of movement of the shutter actuating member to release the same, whereby exposure operation is carried out.

In a preferred embodiment of the present invention, there is provided means responsive to the movement of the second arresting member toward the outside of the path of movement of the shutter actuating member, for locking the focus memory operating member at the neutral position. Accordingly, the focus memory operating member is prevented from operation after a shutter release operation is made to carry out normal photographing. Additionally, the focus memory operating member is also operable to a resetting position, and includes means for returning the movable member to the initial position when the focus memory operating member is operated to the resetting position. The range finding means and the objective setting means are reset by the returning movement of the movable member, so that automatic focus readjustment is made possible.

In accordance with the present invention, the spring means for biasing the movable member may have a relatively small force because the movable member always completes its travelling, and the first arresting member is moved toward the outside of the path of movement of the shutter actuating member, by the movable member which moves with a relatively great kinetic energy.

BRIEF DESCRIPTION OF THE DRAWING

The above and other objects and features of the present invention will become more apparent from the following description taken in conjunction with the accompanying drawing, which is a schematic illustration of a camera automatic focus adjustment mechanism according to a preferred embodiment of the present invention.

DESCRIPTION OF THE PREFERRED EMBODIMENT

Shutter release operating member 2, carrying pins 2a and 2b, is biased upwards by spring 4. Power switch 6, designed to be closed by contact with pin 2a upon depression of shutter release operating member 2, supplies power to at least a range finding circuit and a focus adjusting circuit, as well as to an exposure control circuit and an electronic flash firing circuit as required. Pin 2b, when shutter release operating member 2 is depressed, engages arm 5a of second shutter actuation blocking lever 5 (described infra) to thereby rotate restraining lever 12 counterclockwise. Focus-freeze, or focus-lock, operating member 8 pivoted on pin 9 is biased clockwise by spring 10, thereby abutting against arm 12b of restraining lever 12. Restraining lever 12 pivoted on shaft 14 is biased clockwise by spring 16, normally abutting on stopper pin 18. At the normal stop position of restraining lever 12, arm 12c engages preceding member 22 to block the leftward movement thereof. Focus-freeze operating member 8 can be operated so that it may be rotated clockwise about pin 9, and such clockwise rotation causes restraining lever 12 to rotate counterclockwise about shaft 14, thereby disengaging arm 12c from preceding member 22, while switch 7 is closed thereby. Power switch 7 is provided in parallel to power switch 6 and therefore, even when power switch 6 is opened, power switch 7 is closed to supply power to the respective circuits. When second shutter actuation blocking lever 5 is rotated counterclockwise by pin 2b, focus-freezing blocking lever 20 is rotated clockwise about shaft 21 against the action of spring 21a when end 20a is pressed by the tip of other arm 5b of second shutter actuation blocking lever 5; other end 20b of focus-freeze blocking lever 20 being engaged with cutout 8c formed on focus-freeze operating member 8, which is thus blocked from rotating.

Preceding member 22 is slidably guided by pins 28 and 30 travelling in slots 22a and 22b, and is biased leftward by spring 32. Rack 22c is formed on the bottom of preceding member 22 and translates while it is damped by ankle 34 and engages pinion 36 acting as a speed adjusting member for preceding member 22. V-shaped cams 22d and 22e are formed on the top surface of preceding member 22. Rotating lever 38 is fitted with reflecting mirror 44 which reflects light ray 11, for a camera-to-object distance detection or range finder, to light receiving element 43 through condenser 40 and reflecting surface 42. Rotating lever 38 is biased clockwise by spring 46, with pin 48 carried by the tip of rotating lever 38 abutting against the top edge of preceding member 22, including cam surfaces 22d and 22e, and when preceding member 22 moves leftward, reflecting mirror 44 is moved according to cam surfaces 22d and 22e, whereby the field of an object is scanned by the reflecting mirror. Detecting light ray 12 is incident upon light receiving element 56 through fixed reflecting mirror 50, condenser 52 and reflecting surface 54. Detecting light ray 12 is substantially matched to the optical axis of camera photographic lens 58, and when reflecting mirror 44 is rotated to cause both light rays 11 and 12 to cross over the surface of an object, i.e., when light from an identical portion in the field of an object is incident on light receiving elements 43 and 56, the light intensity or illumination distribution incident on light receiving elements 43 and 56 by both light rays 11 and 12 coincide with each other, and a range finding circuit (not shown) connected to light receiving elements 43 and 56 generates a signal indicating that the object is in focus.

Photographic lens 58 is held by lens barrel 60, which is moved along the optical axis of the camera photographic lens when rotated by gear portion 60a formed on the periphery of lens barrel 60. Lens driving member 62 is horizontally and slidably guided by pins 64 and 66 retained in slots 62a and 62b, and is biased leftward by spring 68, thereby abutting against preceding member 22 to follow the movement thereof. Rack 62c is formed on the bottom edge of lens driving member 62 and is engageable with gear portion 60a on the periphery of lens barrel 60 of photographic lens 58. Saw-tooth portion 62d is formed on the top surface of lens driving member 62 and is engaged with restraining claw 70. Restraining claw 70 is biased clockwise by spring 72 and is normally held in a retracted position (as shown) by permanent magnet 74a of electromagnetic device 74. A detecting signal is generated according to the outputs of light receiving elements 43 and 56 (by circuitry well known to the skilled artisan), and when electromagnetic winding 74b is energized by a current under the control of a focus adjusting circuit according to the aforementioned light receiving element outputs, a magnetic field opposite to that of the permanent magnet occurs, releasing restraining claw 70 from the retracted position thereof by permanent magnet 74a, whereby restraining claw 70 is rotated clockwise by the force of spring 72. Index 60b is moved integrally with lens barrel 60, or in relation to lens barrel 60, and is indexed to any one of distance marks 76 on the camera body for indication of automatically set photographic distances.

Shutter actuating member 78 is shifted leftward by the force of spring 80, and by means of lever 82 biased clockwise and rotatably pivoted on bottom projection 78a, shutter actuating lever 78 opens or closes shutter blade 86 through intermediate lever 84. Shutter actuating lever 78 has top projection 78b which abuts projection 22f formed on the bottom edge of preceding member 22. A plurality of shutter blades in the identical form of shutter blade 86 are symmetrically provided (although only a single blade is shown), the slots thereof being fitted onto the bottom pin of intermediate lever 84. First shutter actuation blocking lever 88 normally abuts against stopper pin 92 by spring 90, in which condition, first shutter actuation blocking lever 88 is located in the movement path of shutter actuating member 78, thus making it possible to block the leftward movement of shutter actuating member 78.

Second shutter actuation blocking lever 5 is biased for clockwise rotation about shaft 5c by the force of spring 5d, and in the stop position thereof by the abutment thereof on stopper pin 5e, end 5b is located in the movement path of projection 78c of shutter actuating member 78, thereby making it possible to block the leftward movement of shutter actuating member 78.

NORMAL PHOTOGRAPHIC OPERATION

Upon depression of shutter release operating member 2 under the condition shown in the diagram, power switch 6 is closed, causing suitable range finding and focus adjusting circuits known to the art to commence operating. In the meantime, second shutter actuation blocking lever 5, with arm 5a thereof depressed by pin 2b, is rotated counterclockwise to retract arm 5b from the movement path of projection 78c of shutter actuating member 78, thereby rotating focus-freeze blocking lever 20 clockwise, which causes end 20b to be fitted into cutout 8c, thereby restraining focus-freeze operating member 8. Restraining lever 12, with arm 12a thereof pushed by pin 2a, is rotated counterclockwise, causing arm 12c and preceding member 22 to be disengaged from each other, whereby preceding member 22 starts moving leftward by the force of spring 32. Lens driving member 62 and shutter actuating member 78 follow preceding member 22 by the force of springs 68 and 80. The leftward movement of lens driving member 62 rotates lens barrel 60 to thereby shift photographic lens 58. Shutter actuating member 78 engages first shutter actuation blocking lever 88 immediately upon commencement of that leftward movement, and thus shutter actuating member 78 is blocked from further leftward movement. In conjunction with the leftward movement of preceding member 22, reflecting mirror 44 is rotated clockwise while pin 48 slides on cam surface 22d to thereby scan from infinity to the closest distance, and reflecting mirror 44 is rotated counterclockwise while pin 48 slides on cam surface 22e to thereby scan from the closest distance to infinity. While reflecting mirror 44 is moved by cam surface 22d, the light intensity of light rays 11 and 12 incident on light receiving elements 43 and 56, or the illumination distribution thereon, is matched to each other, and the matched signal generated therefrom by circuitry known to those skilled in the art is stored by a range finding circuit also known to those skilled in the art. While reflecting mirror 44 is moved by cam surface 22e, signal commensurate with the outputs of light receiving elements 43 and 56 becomes equal to the aforementioned matched signal. At this point, a detecting signal indicating an object in focus is generated by circuitry known to those skilled in the art from the range finding circuit. This detecting signal causes a focus adjusting circuit also known to the art to energize electromagnetic winding 74b, whereby restraining claw 70 is fitted into one of the grooves of saw-tooth portion 62d on lens driving member 62, thereby causing lens driving member 62, lens barrel 60 and photographic lens 58 to be stopped. Thus, photographic lens 58 is automatically set to an in-focus position for the object.

Even after the leftward movement of lens driving member 62 has been stopped by restraining claw 70, preceding member 22 continues the leftward movement thereof, and when the tip thereof abuts first shutter actuation blocking lever 88, it rotates lever 88 counterclockwise. Immediately after commencement of the leftward movement of preceding member 22, first shutter actuation blocking lever 88 blocks the leftward movement of shutter actuating member 78; however, the blocked condition thereof is released by the counterclockwise rotation of first shutter actuation blocking lever 88, whereby shutter actuating member 78 is moved to the left by the force of spring 80. As a result, the shutter blades are driven through levers 82 and 84 to be opened and closed to effect film exposure.

FOCUS-FREEZE PHOTOGRAPHY OPERATION

For focus-freeze photography, a range finding mark (not shown) is matched to the image of a desired object in the view field of the viewfinder prior to photography. Focus-freeze operating member 8 is then rotated clockwise as shown in the diagram. This causes power switch 7 to be closed and the aforementioned range-finding and focus adjusting circuits to start operating, and at the same time, restraining lever 12 is rotated counterclockwise when arm 12a is pressed, whereby arm 12c and preceding member 22 are disengaged from each other. As a result, preceding member 22, and lens driving member 62 are moved leftward in a similar manner to normal photographic operation, and photographic lens 58 is automatically set to an in-focus position for the object. In this case, however, the leftward movement of shutter actuating member 78 is blocked by arm 5b of second shutter actuation blocking lever 5, causing no opening and closing movement of shutter blade 86 to occur even when first shutter actuation blocking lever 88 is rotated counterclockwise by preceding member 22.

When shutter release operating member 2 is then depressed, pin 2b rotates second shutter actuation blocking lever 5 counterclockwise, whereby arm 5b and projection 78c are disengaged from each other, causing shutter actuating member 78 to be moved to the left, and shutter blades 86 to be opened and closed to effect film exposure. Therefore, when the camera direction is changed, prior to depressing shutter release operating member 2, so that the object may be caught in a corner of the view field of the viewfinder out of the range finding mark, for example, photography is possible with the object remaining in focus.

It should be noted that, when it is desired to change the object to be the subject for focus-freeze photography or to change focus-freeze photography to normal photography prior to depressing shutter release operating member 2, focus-freeze operating member 8 may be rotated counterclockwise for resetting. This causes focus-freeze operating member 8 to engage end 8d thereof with the left end of preceding member 22 to thereby push preceding member 22 rightward, while retracting preceding member 22 from arm 12a of restraining lever 12 which is in turn allowed to rotate clockwise, whereby preceding member 22 is again engaged by arm 12c of restraining lever 12. Furthermore, the rightward movement of preceding member 22 causes first shutter actuation blocking lever 88 to be returned by the force of spring 90 to its initial position so that it may be located again in the movement path of shutter actuating member 78. Additionally, lens driving member 62 is also moved to the right to thereby return photographic lens 58 to its initial position, while restraining claw 70 also again abuts against the magnetic pole of electromagnetic device 74 by cam 62e, formed on the top edge of lens driving member 62, restraining claw 70 attracted and held to the magnetic pole by permanent magnet 74a. Therefore, the individual members are all reset to their position before focus-freeze operating member 8 is operated, thereby making focus-freeze photography for a new object possible by again operating focus-freeze operating member 8. It is also possible to perform normal photography instead of focus-freeze photography whenever such operation is required. However, normally, the members are re-set by resetting preceding member 22 to the right through a known means (not shown) upon a film winding operation, for example.

What is claimed is:

1. Automatic focus mechanism for a camera enabling sequential automatic focus adjustment and exposure operation in response to a shutter release operation, and automatic focus memory adjustment independently of exposure operation at any time prior to shutter release operation, comprising:
    a shutter;
    a release member movable by shutter release operation;
    a range finding means;
    a movable member movable from an initial position to a terminal position for operating said range finding means;
    a focus memory operating member movable between a neutral position for normal photography and an operative position for focus memory photography;
    a locking member adapted to lock said movable member at said initial position and operatively connected to said release member and said focus memory operating member for releasing said movable member either with said release member moved by a given first stroke or with said focus memory operating member moved to said operative position;
    an objective;
    an objective setting member for setting said objective and biased to follow said movable member upon movement thereof from said initial position to said terminal position;
    arresting means connected to said range finding means for arresting said objective setting member to set said objective at an optimum focus with respect to an object being viewed by said range finding means;
    a shutter actuating member biased to follow said movable member for actuation of said shutter with movement of said movable member from said initial position to said terminal position;
    a first arresting member for preventing said shutter actuating member from following said movable member, and also adapted to be engaged by said movable member prior to the terminal position thereof being reached to enable said shutter actuating member to follow said movable member; and
    a second arresting member for preventing said shutter actuating member from following said movable member upon the movement thereof from said initial position to said terminal position, and also adapted to be engaged by said release member when said release member is moved by a given second stroke shorter than said first stroke to enable said shutter actuating member to follow said movable member.

2. Automatic focus mechanism as defined in claim 1, further comprising means responsive to the movement of said second arresting member for releasing said shutter actuating member to lock said focus memory operating member at said neutral position.

3. Automatic focus mechanism as defined in claim 1, wherein said focus memory operating member is movable to a resetting position, and includes means for returning said movable member from said terminal position to said initial position by movement of said focus memory operating member to said resetting position.

4. Automatic focus mechanism as defined in claim 1, further comprising:
    a first switch actuated in response to the movement of said release member for making said range finding means operative before said second arresting member releases said shutter actuating member; and
    a second switch actuated in response to movement of said focus memory operating member to said operative position for making said range finding means operative.

5. Automatic focus mechanism as defined in claim 4, wherein said range finding means includes first optical means having an optical axis substantially coinciding with that of said objective, a second optical means spaced a given distance from said first optical means, means for driving said second optical means in response to the movement of said movable member from said initial position to said terminal position such that the optical axis of said second optical means sequentially scans a scene in front of said camera, and first and second light receiving means respectively receiving light from said first and second optical means, and said arresting means being actuated with substantially equal light incident on said first and second light receiving means with actuation of said first or second switch.

* * * * *